United States Patent [19]

Cerny

[11] 4,189,928

[45] Feb. 26, 1980

[54] ICE TOP MEAT CUTTING APPARATUS

[76] Inventor: Adrian F. Cerny, P.O. Box 44, Bloomington, Wis. 53084

[21] Appl. No.: 936,023

[22] Filed: Aug. 23, 1978

[51] Int. Cl.² .............................................. F25C 1/12
[52] U.S. Cl. ........................................ 62/66; 62/261; 62/340
[58] Field of Search ................... 62/235, 261, 66, 340, 62/458, 258, 59, 72

[56] References Cited

U.S. PATENT DOCUMENTS

| | | | |
|---|---|---|---|
| 2,105,566 | 1/1938 | Waunch | 62/254 |
| 2,156,795 | 5/1939 | Smith | 62/254 |
| 2,163,062 | 6/1939 | Riesenkonig | 62/458 X |
| 2,301,780 | 11/1942 | Heinzelman | 62/235 |
| 2,978,883 | 4/1961 | Jessee | 62/354 X |
| 2,996,896 | 8/1961 | Johnson | 62/235 |
| 3,405,534 | 10/1968 | Sullivan | 62/239 X |
| 3,422,600 | 1/1969 | Chamberlain | 55/126 |
| 3,933,002 | 1/1976 | Vickery | 62/235 X |

*Primary Examiner*—Albert J. Makay
*Assistant Examiner*—William E. Tapolcai, Jr.

*Attorney, Agent, or Firm*—Michael, Best & Friedrich

[57] ABSTRACT

An ice top meat cutting apparatus and method for forming the same, the apparatus including a frame having an upper support member extending substantially above floor level, side walls preferably made of an elastomeric material and connected to the support member and being movable between an upright position defining an enclosure having an open top, and a down position, and cooling apparatus associated with the enclosure for freezing liquid contained within the enclosure to provide an ice top having an upper cutting surface suitable for cutting meat thereon. A preferred method for forming and maintaining the ice top meat cutting apparatus includes the steps of moving the side walls to the upright position defining the enclosure, filling the enclosure with liquid, freezing the liquid contained within the enclosure to provide the ice top, and moving the side walls to the down position to provide an unobstructed upper cutting surface. In order to regenerate the ice top and upper cutting surface to its original dimensions, the preferred method also preferably includes periodically repeating the steps recited above.

15 Claims, 4 Drawing Figures

U.S. Patent
Feb. 26, 1980
4,189,928
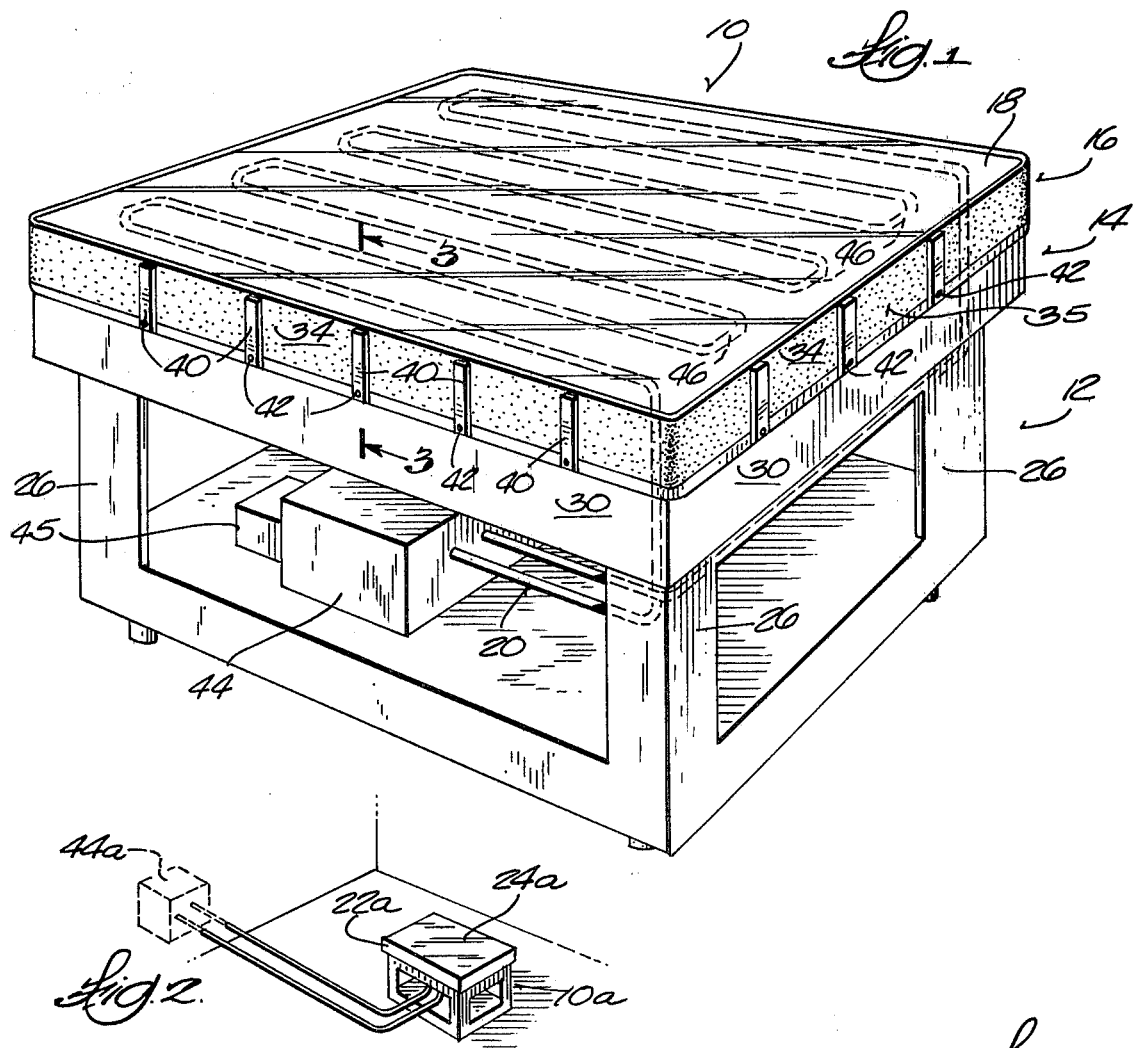
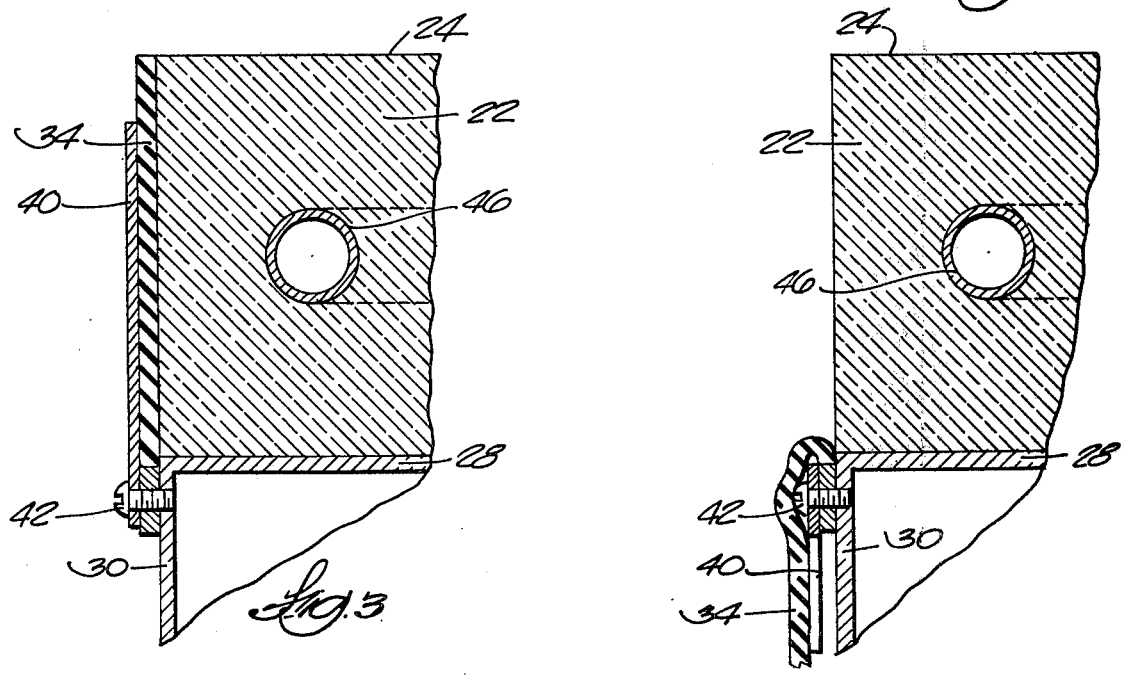

ICE TOP MEAT CUTTING APPARATUS

BACKGROUND OF THE INVENTION

I. Field of the Invention

The invention relates generally to the meat cutting industry, and more particularly, relates to meat cutting tables.

II. Description of the Prior Art

Meat cutting tables have been utilized for many years to break-down carcasses of butchered animals such as cows, or hogs into, for example, quarter sections, or more often, into smaller cuts of meat sized for wholesale and retail sale. A well known problem associated with wholesale and retail meat cutting operations is the difficulty encountered in attempting to maintain a sanitary work or cutting surface on the meat cutting table to prevent the build-up of bacteria and other foreign matter on the meat being processed for sale.

Typically, in order to inhibit bacterial growth, the meat, before processing, is stored in coolers at a temperature just above freezing, and is processed in refrigerated meat cutting rooms where the temperatures generally do not exceed 50° fahrenheit. As will be discussed later below, various arrangements have been proposed to refrigerate the meat cutting surface so that the room temperature can be elevated to provide a more pleasant working environment. Even when meat cutting is done in rooms having these lower temperatures, there still exists a serious problem with bacterial build-up on the work surfaces of the meat cutting tables during the meat cutting process.

For many years, the work or cutting surface of meat cutting tables has been composed of a hard wood, such as maple. Such a hardwood work surface is subject to being cut and cracked by meat cutting saws or cleavers, and meat scraps and fluids become lodged in such cuts and cracks. The cleaning of such hardwood work surfaces is time consuming and requires that such work surfaces be scraped clean, and then washed down with an antiseptic solution such as bleach. Despite the time and rigor of the cleaning process, it is virtually impossible to completely clean a hardwood work surface because bacteria and other foreign matter remains lodged in the cuts and cracks, and even in the pores of the wood.

An associated and serious problem with such wood surface meat cutting tables relates to the transition between the cutting of beef and the cutting of pork. It is well known that pork meat is often infected with the trichina worm and larva which, during the cutting process, often become lodged, and therefore out of reach of the cleaning process, in the cracks and pores of the wood cutting surface. Thus, even though wood cutting surfaces are cleaned between cutting pork and beef, the trichina worm can be transferred to the beef. Since beef is less likely to be cooked by consumers sufficiently long to destroy the trichina worm, use of wood cutting surfaces presents the danger of consumers contracting trichinosis. For this reason, during a typical day, the beef is cut first, the cutting surface is cleaned, and then the pork is processed at the end of the day. Nevertheless, the carry over of the trichina from the end of one day to the beginning of the next results in the contamination of beef with trichina worms still being a serious problem.

Meat cutting tables are regularly inspected by state and federal authorities to insure that such tables meet specified minimum sanitation standards. At one time, because of the inability of thoroughly cleanse the wood surface of wood meat cutting tables, such wood meat cutting tables were outlawed. The meat cutting industry was forced to shift to meat cutting tables having a hard plastic cutting surface. This switch from wood cutting surfaces was short lived, however, since it was found that plastic cutting surfaces were also susceptible to chipping and cracking and difficult cleaning. In addition, the plastic cutting surfaces contaminated the meat products cut thereon with fragments of plastic dangerous to consumers. At present, both hardwood and plastic cutting surfaces are used on meat cutting tables, but each cutting surface has the disadvantages as described above.

In addition to the problem with cleaning, such wood and plastic cutting surfaces are subject to wear and breakage so that replacement or refinishing is frequently required. For example, a plastic meat cutting surface may have to be replaced every six months or more often, while a typical 3 or 4 inch hard maple cutting surface may have to be refinished and/or replaced every year.

As mentioned earlier, in order to inhibit bacterial growth during the meat cutting process, the temperature of the cutting room is ordinarily not allowed to increase above 50° fahrenheit. Such a cold working environment is extremely unpleasant for workers. Various prior art arrangements have been proposed for keeping the wood surface of a meat cutting table relatively cold in order to inhibit bacterial growth, and yet to allow the room temperature to be increased above 50°.

Typical examples of such arrangements which refrigerate the cutting surfaces of the meat cutting table or cutting block are shown in Smith, U.S. Pat. No. 2,156,795, issued May 2, 1939 and Waunch, U.S. Pat. No. 2,105,566, issued Jan. 18, 1938. In both of these patents, apparatus is disclosed wherein cooling or refrigeration coils are located in proximity to and below fabricated or wood cutting blocks. These refrigerated cutting blocks are removable with respect to the refrigeration coils so that the block can be refinished or cleaned or otherwise treated. The insulating value of the structure adjacent the refrigeration coils is greater than the wood cutting blocks so that the cold temperature developed by the coils will be conveyed through and chill the meat cutting block. It was recognized in the Waunch patent, that as a result of the refrigerated condition, bacterial development and growth on the face of the meat cutting block was retarded.

Another proposal for depressing the temperature of the working surface of cutting tables was disclosed in Chamberlain, U.S. Pat. No. 3,422,600, issued Jan. 21, 1969, wherein an apparatus was disclosed with a plenum located above the meat cutting surface for directing cold air onto the working surface of the meat cutting table. An object of the Chamberlain invention was to provide such a refrigerated meat cutting table surface which maintained the temperature of the meat at about 20° F., without chilling the worker, thereby resulting in less worker complaint and illness.

While the problem of bacterial "growth" is reduced by these prior art arrangements which provide for refrigerating the meat cutting surface or meat cutting blocks, such arrangements are not effective in preventing bacteria growth "build-up" which occurs during the day as different pieces of meat are repeatedly placed on the same cutting surface. Similarly, the problems related to deterioration of the wood cutting surface, and to the time consuming and difficult cleaning of the cutting surface, were again, not effectively solved.

Thus, to summarize, all prior art meat cutting tables have had cutting surfaces exhibiting problems associated with bacterial growth and/or bacteria buildup, time consuming and ineffective cleaning, and deterioration, requiring eventual replacement of the cutting surface.

In view of the many serious problems of the prior art, this invention has among its objects to provide a meat cutting apparatus, and method for forming the same, which eliminates some or all of the problems exhibited by the prior art.

More particularly, this invention has among its objects to provide a meat cutting apparatus with an ice top having an upper cutting surface which can be readily cleaned, inhibits bacterial growth, and which eliminates the problems of contaminating the meat with chips of wood or plastic or other foreign material.

This invention also has among its objects to provide such an ice top meat cutting apparatus wherein the ice top meat cutting surface can be quickly cleaned, and if desired, regenerated to its original dimensions without interrupting the meat cutting operation for an appreciable amount of time.

This invention also has among its objects to provide such an ice top meat cutting apparatus wherein the growth of bacteria is effectively prevented, and the detrimental effect of build-up of bacteria can be readily avoided by rapid cleaning or washing down of the ice top cutting surface.

This invention also has among its objects to provide such an ice top meat cutting apparatus wherein the ice top and cutting surface can be maintained at any desired temperature below freezing in order to allow the temperature of the meat cutting room to be elevated, thereby providing workers with a more pleasant and healthy working environment.

This invention also has among its objects to provide such an ice top meat cutting apparatus having a cutting surface which freezes the outer surface of the meat being cut thereon, thus enhancing the bloom of the meat and increasing the meat's shelf life.

Another object of the invention is to provide such an ice top meat cutting apparatus wherein the cooling means for freezing the ice top includes a compressor isolated from the remaining portion of the meat cutting apparatus so that the apparatus contributes to refrigerating the meat cutting room, and, hence, so that the energy expended to operate the apparatus is efficiently utilized.

SUMMARY OF THE INVENTION

In order to achieve the foregoing and other objects, the invention provides an ice top meat cutting apparatus and method for forming the same. The apparatus includes a frame having an upper support member extending substantially above floor level, enclosure means connected to the upper support member for movement to a first position for defining an enclosure having an open top and for containing liquid which can be frozen to provide an ice top having an upper cutting surface suitable for cutting meat thereon, and movable to a second position displaced from the first position for providing the ice top with an unobstructed upper cutting surface, and cooling means for freezing liquid contained within the enclosure.

The preferred method for forming and maintaining the ice top meat cutting apparatus includes the steps of (1) supporting an open topped generally water tight enclosure substantially above floor level, (2) filling the enclosure with liquid, and (3) freezing the liquid contained within the enclosure to provide an ice top having an upper cutting surface suitable for cutting meat thereon.

According to a preferred embodiment of the invention, the enclosure means of the apparatus includes elastomeric side wall means, preferably formed by a continuous gum rubber strip, and movable between an upright position for defining the enclosure, and a down position, to provide an unobstructed upper cutting surface. To form and maintain the apparatus with this arrangement, the second (2) step of the above recited method includes moving the side walls to the upright position. The method preferably further comprises (4) moving the side walls to the down position to provide an unobstructed ice top. In order to regenerate a worm cutting surface, the preferred method also comprises periodically repeating steps 2, 3 and 4 as recited above.

In a preferred construction, the cooling means preferably includes a compressor, cooling coils communicating with the compressor and located in the enclosure, and temperature control means. In order to provide efficient operation, the compressor can be located in a different room from the cooling coils so that the apparatus contributes to refrigerating the meat cutting room in which it is located.

Other features, advantages and objects of the invention will become apparent from the following drawing, general description, and claims.

BRIEF DESCRIPTION OF THE DRAWINGS

FIG. 1 is a diagrammatic perspective view illustrating an ice top meat cutting apparatus embodying various features of the invention.

FIG. 2 is a reduced perspective view of an ice top meat cutting apparatus similar to that shown in FIG. 1, illustrating another embodiment of the invention.

FIG. 3 is a partial sectional view taken along lines 3—3 shown in FIG. 1.

FIG. 4 is a view similar to FIG. 3 illustrating a side wall of the apparatus moved to a down position.

DESCRIPTION OF THE PREFERRED EMBODIMENT

Referring more particularly to the drawings, wherein like numerals refer to like parts throughout the several views, FIG. 1 shows an ice top meat cutting apparatus, preferably in the form of a table, generally designated 10, which embodies various features of the invention. The table 10 includes a frame 12 having an upper support member 14 extending substantially above floor level, i.e., at waist level, or at a level suitable for workers to cut meat on the table 10 while in a standing position.

The table 10 includes enclosure means, generally designated 16, connected to the upper support member 14, for defining a generally water tight enclosure 18 having an open top, and also includes cooling means, generally designed 20, associated with the enclosure 18 for freezing liquid or water contained in the enclosure to provide an ice top 22 having an upper cutting surface 24 suitable for cutting meat thereon.

As shown in FIG. 1, the frame 12 preferably includes four legs 26 which rest at ground or floor level and are suitably connected to, and which support the upper support member 14. Other frame arrangements could be utilized, however, for example, the frame could extend from a wall so that the apparatus is in the form of a counter. The upper support member 14 extends substantially above floor level and includes a generally horizontal support surface 28 (FIGS. 3 and 4) and downwardly depending side edges 30 which fit over adjacent upper portions of the legs 26. It is to be understood, that if desired, the frame 12 and/or the upper support member 14 and/or the enclosure means 16 could be formed as integral members.

While various arrangements are possible, the enclosure means 16 preferably is made up of side walls means or side walls 34 connected to the upper support member 14 and movable between an upright position (see FIGS. 1 and 3) defining the open topped enclosure 18, and a down position (see FIG. 4). The side walls 34 of the enclosure means are preferably made of an elastomeric material, such as a gum rubber strip 35, as shown in FIG. 1. The opposite ends of the strip (not shown) may be connected to each other by epoxy or other suitable means. The strip 35 extends around and upwardly from the side edges 30 of the upper support member 14. The elastomeric or gum rubber material forms its own seal with the upper support member 14 so that the enclosure 18 is substantially water tight.

The ice top meat cutting apparatus 10 preferably includes vertical support means (shown as bars 40), movably or pivotally connected to the upper support member 14, for supporting the elastomeric side walls 34 in an upright position. The vertical support means can be moved or pivoted downwardly to allow the elastomeric side walls to be folded over the support means and moved to the down position as shown in FIG. 4.

While various arrangements could be utilized, the vertical support means preferably comprises stainless steel bars 40 held in position by bolts 42 which extend through apertures in the bars 40 and the elastomeric side walls 34, and into threaded apertures in the side edges 30 of the upper support member 14. As shown in FIGS. 3 and 4, the bars 40 can be moved so that the side walls 34 can be pivoted from an upright position to a down position to provide an unobstructed ice top meat cutting surface, i.e., the side walls 34 are out of the way during meat cutting operations.

The cooling means 20 of the table preferably comprises a conventional compressor, shown as box 44, having refrigeration or cooling coils 46 which extend through apertures (not specifically shown) in the support surface 28 and extend within the enclosure 18 as shown. The table preferably includes conventional temperature control means, diagrammatically shown and generally designated 45, such as a pressure control to regulate the back pressure of the gas flowing through the cooling coils, for example, a pressure control manufactured by Ranco, Inc., located in Columbus, Ohio. Such temperature means could also comprise a thermostat having a bulb extending into the ice top to regulate the operation of the compressor and the temperature of the ice top of the table.

Shown diagrammatically in FIG. 2 is a similar ice top meat cutting apparatus, 10a, which can be provided with a compressor 40a located in another room or a location remote from the refrigeration coils in the enclosure so that the apparatus 10a contributes to the cooling of the room in which the meat is cut. This arrangement results in very efficient operation since any energy not utilized to cool the ice top of the apparatus is utilized to cool the room in which the table is located.

In order to form the ice top, the side walls 34 are folded to their upright position and retained in place by the bars 40. The enclosure 18 is then filled with water and the compressor 40 is activated to freeze the water in the enclosure, thereby providing the ice top 22 having an upper cutting surface 24 suitable for cutting meat thereon. The bars 40 can then be pivotally downwardly and the side walls moved to their down position to leave an unobstructed ice top cutting surface 24 (see FIG. 4). In the preferred construction, the depth of the ice top is about 3½ to 4 inches. The cooling coils are placed about midway between the top and bottom of the enclosure, and the side walls or gum rubber strip is about 5 inches in height and overlaps the side edges 30 by about 1 inch.

The temperature of the cutting surface 24 is preferably kept within a range of 25°-28° fahrenheit. A slight layer of frost builds up on the surface, and assists in keeping the meat from sticking to the cutting surface. Since the surface temperature is maintained below freezing, the outer surface of the meat cut thereon is chilled or frozen so that the pores of the meat close and more juice is retained by the meat, thus enhancing the bloom or red color of the meat, and increasing the shelf life of the meat when put on display for retail sale in refrigerated coolers.

The cutting surface 24 can be cleaned and any cuts removed by scraping and/or washing the surface 24. The water on the cutting surface which remains after cleaning freezes relatively quickly, e.g., in about 3 minutes, to provide a smooth, clean cutting surface. At the end of the work day, if desired, the side walls 34 can again be folded to the upright position and the ice surface regenerated to its original dimensions by filling or topping off the enclosure with water, which again freezes to provide a fresh upper cutting surface having the same dimensions as when first formed.

If desired, the side walls can be left down and the ice top cutting surface 24 can be used repeatedly for several days without regenerating, the surface being merely scraped and washed down during occasional in-progress cleanups or at the end of the day. After substantial wearing down of the cutting surface has occurred, the side walls can again be repositioned to their upright position and the cutting surface regenerated to its original dimensions, as previously described.

Since the upper cutting surface is made of ice, bacterial growth is inhibited. Since the table can be readily cleaned and provided with a new cutting surface, the problem of bacterial buildup can easily be reduced by frequent cleaning. Similarly, the contamination problems with switching from pork to beef can also be minimized, for example, by a rapid and thorough midday cleanup.

It is to be understood the invention is not confined to a particular method, or the particular construction and arrangement of parts herein illustrated and described, but embraces all such modified forms thereof, as come within the scope of the following claims.

I claim:

1. An ice top meat cutting apparatus comprising:
    a frame having an upper support member extending substantially above floor level;
    enclosure means connected to said upper support member for movement to a first position for defining an enclosure having an open top and for containing liquid which can be frozen to provide an ice top having an upper cutting surface suitable for cutting meat thereon, and movable to a second position displaced from said first position for providing said ice top with an unobstructed upper cutting surface; and cooling means for freezing liquid contained within said enclosure.

2. An apparatus as specified in claim 1, wherein said enclosure means comprises side wall means connected to said upper support member for movement between an upright position defining said enclosure, and a down position, said down position providing said ice top with an unobstructed upper cutting surface.

3. An apparatus as specified in claim 2, wherein said side wall means comprises an elastomeric material extending around and upwardly from said upper support member.

4. An apparatus as specified in claim 3, further comprising vertical support means movably connected to said support member for supporting said elastomeric material in said upright position, and for being moved downwardly to allow said elastomeric member to be moved to said down position.

5. An apparatus as specified in claim 1, wherein said cooling means comprises a compressor, and refrigeration coils contained within said enclosure, and communicating with said compressor.

6. An apparatus as specified in claim 5, wherein said compressor is located remote from said refrigeration coils contained in said enclosure so that said apparatus contributes to cooling of the room in which said enclosure is located.

7. An apparatus as specified in claim 5, wherein said cooling means includes temperature control means for maintaining said ice top at a predetermined temperature.

8. An ice top meat cutting apparatus comprising:
a frame having an upper support member extending substantially above floor level;
elastomeric side wall means connected to said upper support member for movement between an upright position defining a generally water tight enclosure having an open top and for containing liquid which can be frozen to provide an ice top having an upper cutting surface suitable for cutting meat thereon, and movable to a down position displaced from said upright position to provide said ice top with an unobstructed uppercutting surface; and
cooling means for freezing liquid contained within said enclosure.

9. An ice top meat cutting apparatus as specified in claim 8, further comprising vertical support means pivotally connected to said support member for supporting said elastomeric side walls in said upright position, and for being pivoted downwardly to allow said elastomeric side walls to be moved to said down position.

10. An ice top meat cutting apparatus as specified in claim 8 wherein said cooling means comprises refrigeration coils located within said enclosure, and a compressor located remote from said refrigeration coils so that said apparatus contributes to cooling of the room in which said enclosure is located.

11. A method for forming an ice top meat cutting apparatus comprising the steps of:
(a) supporting an open-topped generally water tight enclosure substantially above floor level;
said enclosure being formed with sidewall means movable between a first position defining said enclosure, and a second position displaced from said first position;
(b) filling said enclosure with liquid; and
(c) freezing the liquid contained within said enclosure to provide an ice top having an upper cutting surface suitable for cutting meat thereon.

12. A method as specified in claim 11,
wherein said filling step (b) includes moving said side walls to the first position prior to filling said enclosure with liquid; and
wherein said method further comprises:
(d) moving said side walls to said second position after said freezing step to provide an ice top having an unobstructed upper cutting surface.

13. A method as specified in claim 12, further comprising periodically repeating steps (b), (c), and (d) to regenerate said ice top and upper cutting surface.

14. A method for forming and maintaining an ice top meat cutting apparatus comprising the steps of:
(a) supporting a generally water tight open topped enclosure substantially above floor level, said enclosure being formed with side wall means movable between an upright position defining said enclosure, and a down position;
(b) moving said side wall means to said upright position;
(c) filling said enclosure with liquid;
(d) freezing the liquid within said enclosure to provide an ice top having an upper cutting surface suitable for cutting meat thereon;
(e) moving said side wall means to said down position to provide an unobstructed cutting surface; and
(f) periodically repeating steps (b), (c), (d), and (e) to regenerate said ice top and upper cutting surface.

15. An ice top meat cutting apparatus comprising:
a frame having an upper support member extending substantially above floor level;
enclosure means connected to said upper support member for movement to a first position for defining an enclosure having an open top and for containing liquid which can be frozen to provide an ice top having an upper cutting surface suitable for cutting meat thereon, and movable to a second position displaced from said first position for providing said ice top with an unobstructed upper cutting surface;
support means movable connected to said upper support member for supporting said enclosure means when in said first position, and for being moved relative to said enclosure means to allow said enclosure means to be displaced from said first position to said second position; and
cooling means for freezing liquid contained within said enclosure.

* * * * *